(12) United States Patent
Van Hullebusch et al.

(10) Patent No.: US 11,350,573 B2
(45) Date of Patent: Jun. 7, 2022

(54) CRANK-OPERATED PACKER MECHANISM FOR AN AGRICULTURAL BALER

(71) Applicant: CNH Industrial America LLC, New Holland, PA (US)

(72) Inventors: Bart G. L. Van Hullebusch, Knesselare (BE); Ruben Gryson, Beselare (BE); Jeroen Devroe, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/348,664

(22) Filed: Jun. 15, 2021

(65) Prior Publication Data

US 2021/0386020 A1    Dec. 16, 2021

(30) Foreign Application Priority Data

Jun. 15, 2020  (EP) ................................ 20180108

(51) Int. Cl.
*A01F 15/10* (2006.01)
*F16C 3/12* (2006.01)
*F16D 1/10* (2006.01)

(52) U.S. Cl.
CPC ............. *A01F 15/10* (2013.01); *F16C 3/12* (2013.01); *A01F 2015/102* (2013.01);
(Continued)

(58) Field of Classification Search
CPC ............. A01F 15/10; A01F 2015/102; Y10T 403/7035; F16D 2001/103; F16C 3/12; F16C 2310/00
See application file for complete search history.

(56) References Cited

U.S. PATENT DOCUMENTS

| | | | | |
|---|---|---|---|---|
| 1,512,479 A | * | 10/1924 | Oldson | F16C 3/20 74/603 |
| 1,779,805 A | * | 10/1930 | Dunwoodie | F16D 1/08 403/359.6 |
| 2,190,411 A | | 2/1940 | Mattison | |

(Continued)

FOREIGN PATENT DOCUMENTS

| | | | |
|---|---|---|---|
| CN | 1055223 A | * | 10/1991 |
| CN | 201243481 Y | | 5/2009 |

(Continued)

OTHER PUBLICATIONS

Extended European Search Report for application EP20180108.1, dated Nov. 27, 2020 (6 pages).

*Primary Examiner* — Alicia Torres
(74) *Attorney, Agent, or Firm* — Peter Zacharias; Patrick Sheldrake

(57) ABSTRACT

A crank-operated packer mechanism includes crank pins and crank arms assembled by a tapered spline connection. The connection includes tapered spline features on outer ends of the crank pins and in openings provided at outer ends of the crank arms, which interlock when the crank pins are inserted in the openings. The connection further includes a locking feature for locking the connection, such as a locking nut screwed onto a threaded outer end of the crank pins when inserted into the opening. Fixing of rotary bearings onto the crank pins is done by a fixing nut which at the same time serves as a disassembling aid for the spline connection. The crank arms are shaped in a way that deviates from a straight shape to such an extent that the crank shaft is statically balanced about its central rotation axis. Also a baler including the aforementioned packer mechanism.

14 Claims, 8 Drawing Sheets

(52) U.S. Cl.
CPC .... *F16C 2310/00* (2013.01); *F16D 2001/103* (2013.01); *Y10T 403/7035* (2015.01)

(56) References Cited

U.S. PATENT DOCUMENTS

| | | | |
|---|---|---|---|
| 2,364,109 | A | 12/1944 | Taylor |
| 2,471,982 | A | 5/1949 | Shulda |
| 2,747,428 | A | 5/1956 | Peter et al. |
| 4,656,938 | A | 4/1987 | Webb et al. |
| 7,296,393 | B1 | 11/2007 | McClure et al. |
| 2008/0163601 | A1 | 7/2008 | Graber et al. |
| 2014/0123862 | A1 | 5/2014 | Siebenga |

FOREIGN PATENT DOCUMENTS

| | | | | |
|---|---|---|---|---|
| CN | 205142949 | U | 4/2016 | |
| CN | 208987354 | U | 6/2019 | |
| DE | 542056 | C | 1/1932 | |
| DE | 655517 | C | 1/1938 | |
| DE | 822036 | C | 11/1951 | |
| DE | 1242140 | A1 | 6/1994 | |
| DE | 112014006855 | T5 * | 5/2017 | ............. B29C 48/41 |
| EP | 212577 | A1 | 3/1987 | |
| EP | 1479634 | A1 * | 11/2004 | ............. F16C 3/026 |
| EP | 2920477 | B1 | 2/2019 | |
| FR | 859824 | A | 12/1940 | |
| GB | 157886 | A | 3/1922 | |
| GB | 693530 | A | 7/1953 | |
| GB | 1254984 | A | 11/1971 | |
| GB | 2027389 | B | 11/1982 | |
| JP | 2009257512 | A | 11/2009 | |
| JP | 5001803 | B2 | 5/2012 | |
| WO | 2016/008838 | A1 | 1/2016 | |

* cited by examiner

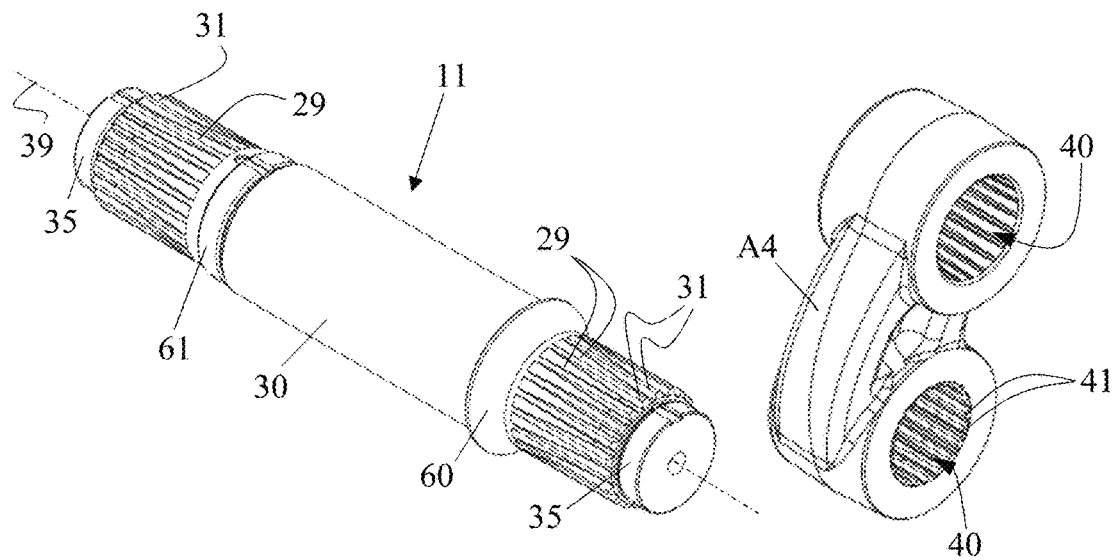
FIG. 5a
FIG. 5b
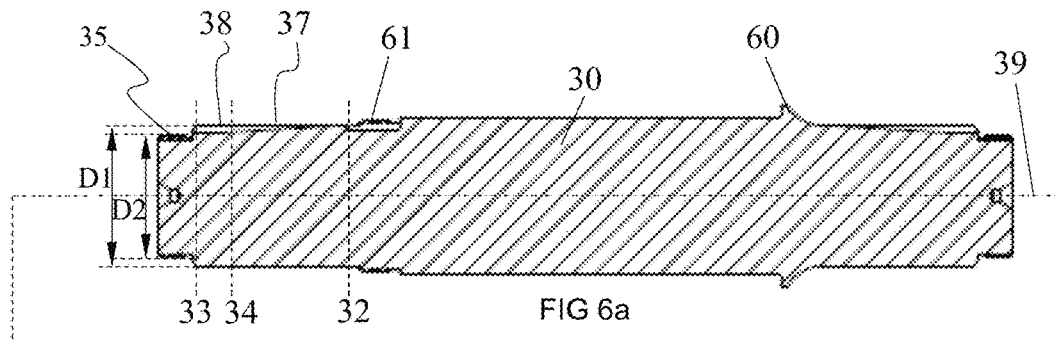
FIG. 6a
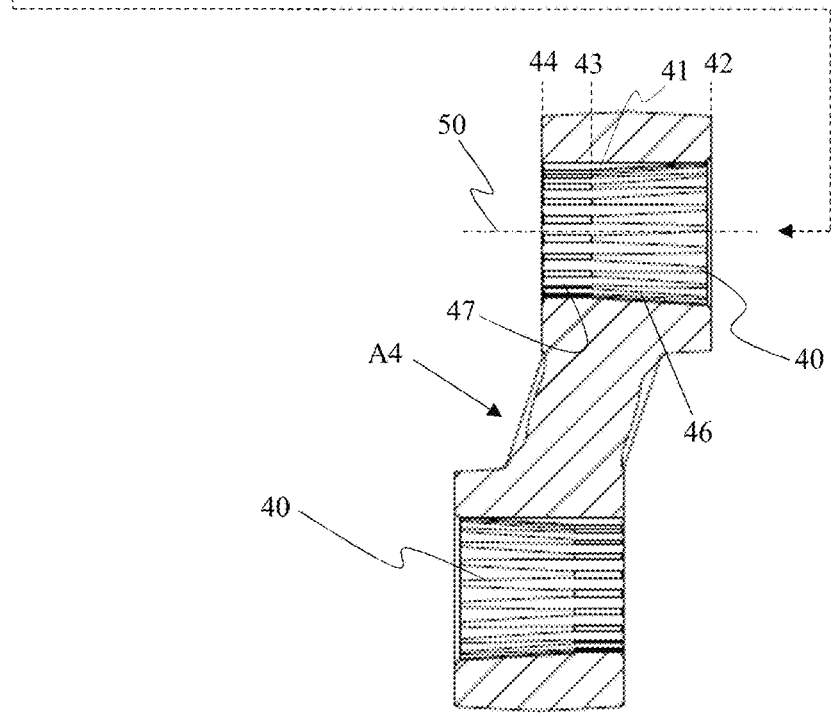
FIG. 6b

CRANK-OPERATED PACKER MECHANISM FOR AN AGRICULTURAL BALER

FIELD OF THE INVENTION

The present invention is related to agricultural balers, designed for processing crops or crop residue into dense bales maintained by wires, straps or other binding materials. The invention is in particular related to a crank-operated packer mechanism applicable primarily in a so-called 'square' baler, i.e. a baler for processing square or rectangular bales, even though the mechanism of the invention is applicable to any type of baler requiring the packing of crop material into a pre-compression chamber.

STATE OF THE ART

Agricultural balers can be either stationary machines to which crops are loaded, or self-propelled or towable machines which pick up crops from the field and automatically process the crops into bales. In a square baler, a packer mechanism moves the received or collected crops into a curved or slanted pre-compression chamber from which the crops are then moved into the baling chamber where they are compressed by a reciprocating plunger. Packer mechanisms known in the art include crank shaft-operated mechanisms and rotor-based mechanisms. The crank shaft-operated packer mechanisms often use welded crank shafts which however exhibit weak spots due to the welding process. This makes these shafts vulnerable to premature failure as a consequence of the high torsion forces occurring during operation. Assembled crank shafts for packer mechanisms have been documented but these are often insufficiently robust and/or difficult to assemble and disassemble. Also, present-day packer crank shafts having more than 2 eccentric crank pins are often statically unstable, leading to premature wear and possible failure of the shaft.

SUMMARY OF THE INVENTION

The invention aims to provide a crank-operated packer mechanism for an agricultural baler that does not suffer from the above problems. This aim is achieved by a packer mechanism and a baler in accordance with the enclosed claims. In a packer mechanism according to the invention, the crank shaft comprises crank pins and crank arms assembled by a tapered spline connection. The connection comprises tapered spline features on the outer ends of the crank pins and in openings provided at the outer ends of the crank arms, which interlock when the crank pins are inserted in the openings. The term 'tapered spline features' preferably refers to one of the following two options:

axially oriented external splines, i.e. ribs extending in the axial direction of the crank pins or the openings in the crank arms, and tapering from a first diameter to a second diameter lower than the first. The valleys in between the tapered splines are then non-tapered.

valleys between two adjacent non-tapered splines, the valleys tapering from a first diameter to a second diameter lower than the first.

The connection further comprises a locking feature for locking the connection, such as a locking nut screwed onto a threaded outer end of the pin when the latter is inserted into an opening of a crank arm.

The tapered spline features realize a strong connection while allowing the separate optimization of the crank pins and the crank arms in terms of their design and material choice. For example, the crank pins may be produced from a steel type having a high toughness and flexibility, while the crank arms may be produced from cast iron.

By choosing a number of tapered spline features at each outer end of the crank pins that is an integer multiple of the number of crank pins, the pins can be produced identical to each other, which decreases the cost of the pins and makes replacement of the crank pins and/or crank arms more straightforward.

According to preferred embodiments, fixing of rotary bearings onto the crank pins is done by a fixing nut which at the same time serves as a disassembling aid for the spline connection.

According to a further embodiment, at least some of the crank arms are shaped in a way that deviates from a straight shape to such an extent that the crank shaft is statically balanced. The arms may for example be curved or hook-shaped.

The invention is also related to a baler comprising a packer mechanism according to the invention. A baler according to the invention can be any baler that requires a packing mechanism for packing crops into a pre-compression chamber. This may be a square baler for producing square or rectangular bales, or a round baler, i.e. a baler for producing cylinder-shaped round bales.

The invention is furthermore related to a packer mechanism of an agricultural baler, the packer mechanism comprising:

a crank shaft (12), that is rotatable about a central rotation axis (100), the crank shaft comprising two or more eccentrically placed crank pins (11), fixed between respective pairs of crank arms (A1-A5), the crank pins (11) comprising two outer ends and a central portion (30), a plurality of packer teeth (10) mounted rotatably with respect to the crank pins (11), at least one rotary bearing (62) mounted on the central portion (30) of the crank pins (11), for enabling the rotation of the teeth (10) relative to the pins, a plurality of support rods (14) for controlling the orientation of the packer teeth (10) during rotation of the crank shaft (12), wherein the packer teeth comprise a front-side edge (71) and a back-side edge (70), and wherein:

the front-side edge (71) is provided with a transversal groove (73) which indicates a starting position for sawing off the tooth (10) when the latter needs to be replaced, the teeth are provided with openings (74) positioned so that when a tooth has been sawn off starting from said groove (73), the openings (74) remain in the remaining tooth portion, the openings (74) enabling screwing on a replacement tooth onto the remaining tooth portion.

BRIEF DESCRIPTION OF THE FIGURES

FIGS. 5a and 5b show 3D images of a crank pin and a crank arm of the crank shaft of FIG. 3.

FIGS. 6a and 6b show section views of the pin and the crank arm shown in FIG. 5.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
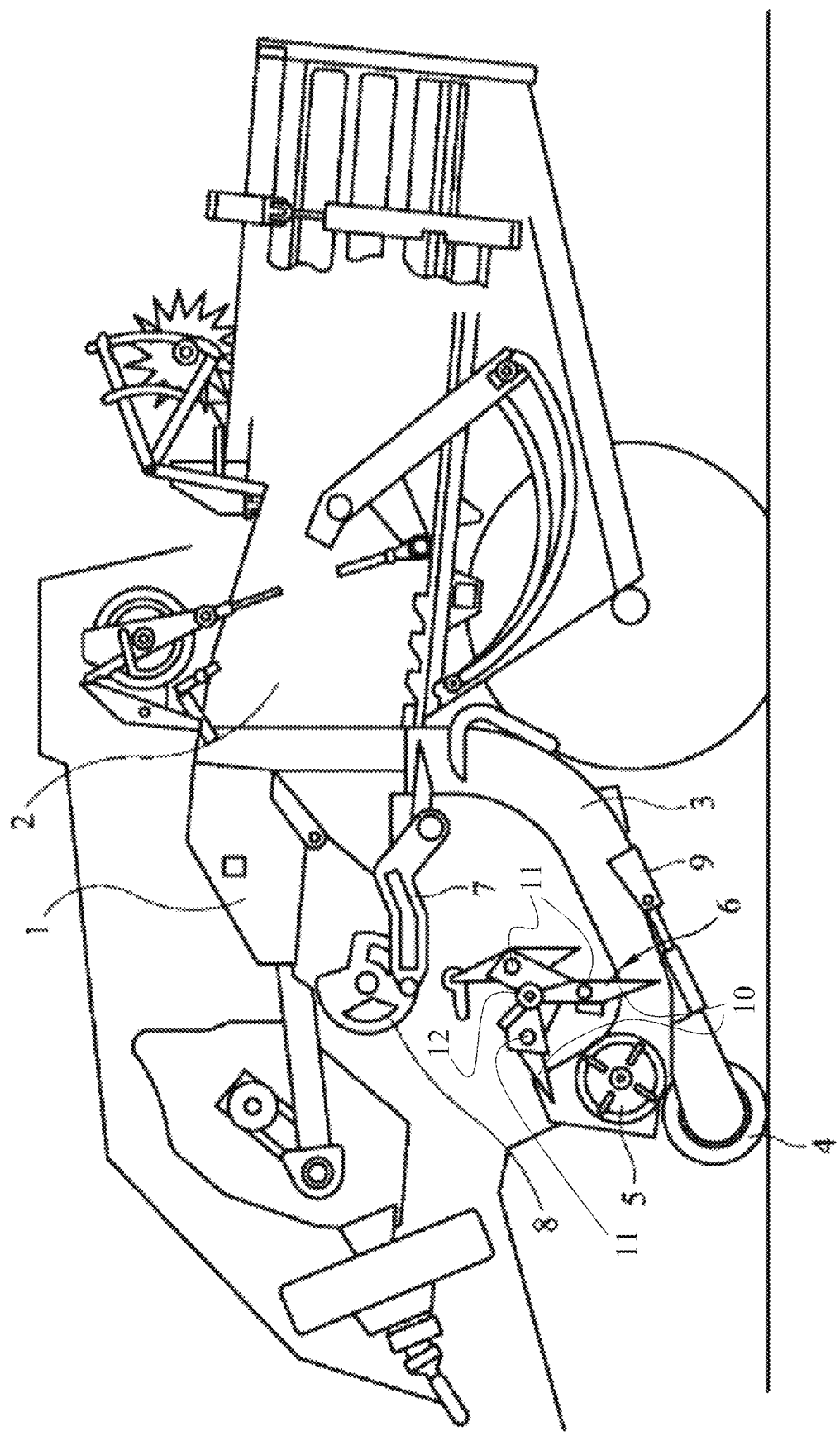
FIG. 1 shows the main components of a square baler including the packer mechanism.

FIG. 1 illustrates an example of a square baler presently known in the art. The following components are indicated: the plunger 1, the baling chamber 2, the pre-compression chamber 3, a pick-up mechanism 4 and a guide roll 5 configured to transport crops towards a packer mechanism 6 for supplying crops to the pre-compression chamber 3, and a stuffer fork 7 configured to push a slice of crops that has gathered in the pre-compression chamber 3, upwards into the baling chamber 2. The stuffer fork 7 is actuated by a rotatable drive means 8, configured to drive the fork 7 only when the pre-compression chamber is full (as detected by a detector 9), and when the plunger 1 is in the retracted position.

The packer mechanism 6 comprises packer teeth 10 which are rotatably mounted on the eccentric crank pins 11 of a crank shaft 12. The crank shaft 12 is rotatably supported through rotary bearings (not shown) on two lateral support locations spaced apart from each other in the direction perpendicular to the drawing, and extending across the width of the baler's incoming stream of crops. The timing between the motion of the teeth 10 is determined by the angular location of the crank pins 11 relative to each other. This concept is known as such in the art.

The invention is related to an improved crank-operated packer mechanism. The crank shaft is an assembled shaft, i.e. it is not a uniform body produced by welding, but it comprises separate elements mounted together by detachable connection means, i.e. the shaft can be assembled and disassembled mechanically. The manner in which the shaft parts are assembled in a packer mechanism according to the invention results in a shaft with a higher mechanical resistance compared to existing shafts used in a baler packer mechanism.

Figure 2:
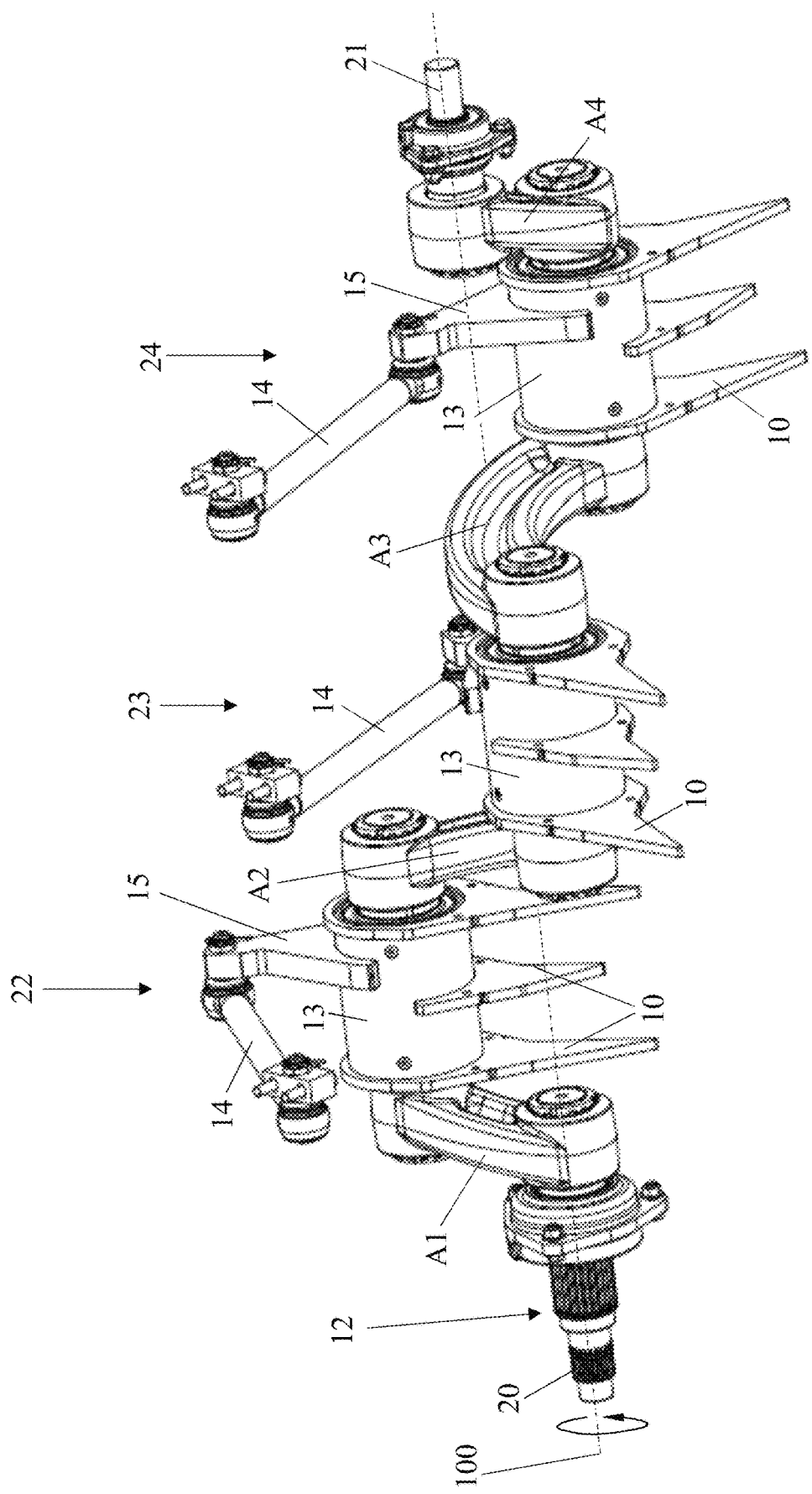
FIG. 2 illustrates a packer mechanism for a baler according to an embodiment of the invention.
Figure 3:
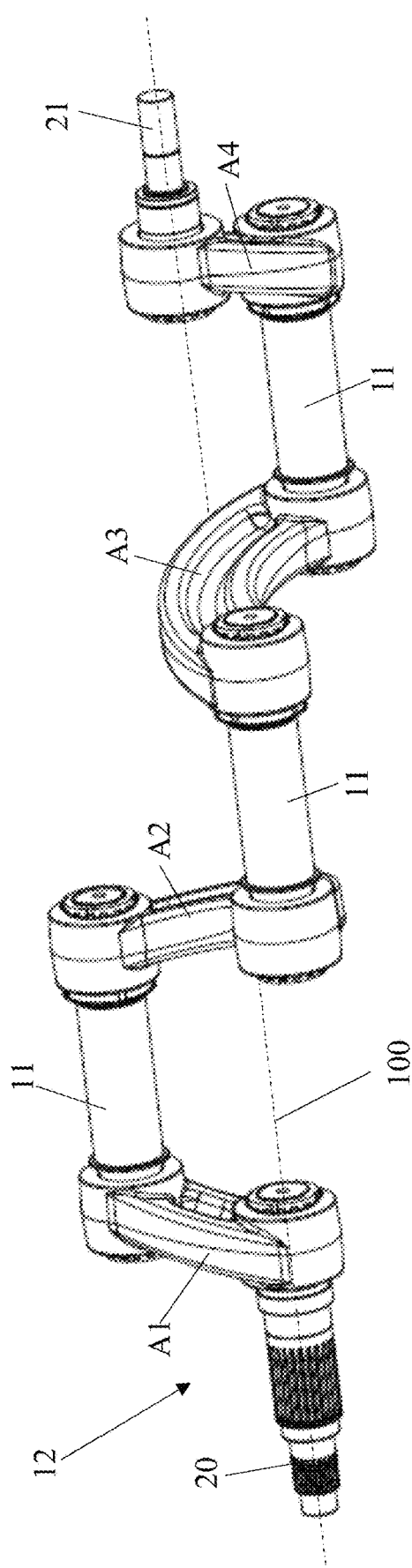
FIG. 3 shows the crank shaft used in the mechanism of FIG. 2.
Figure 4:
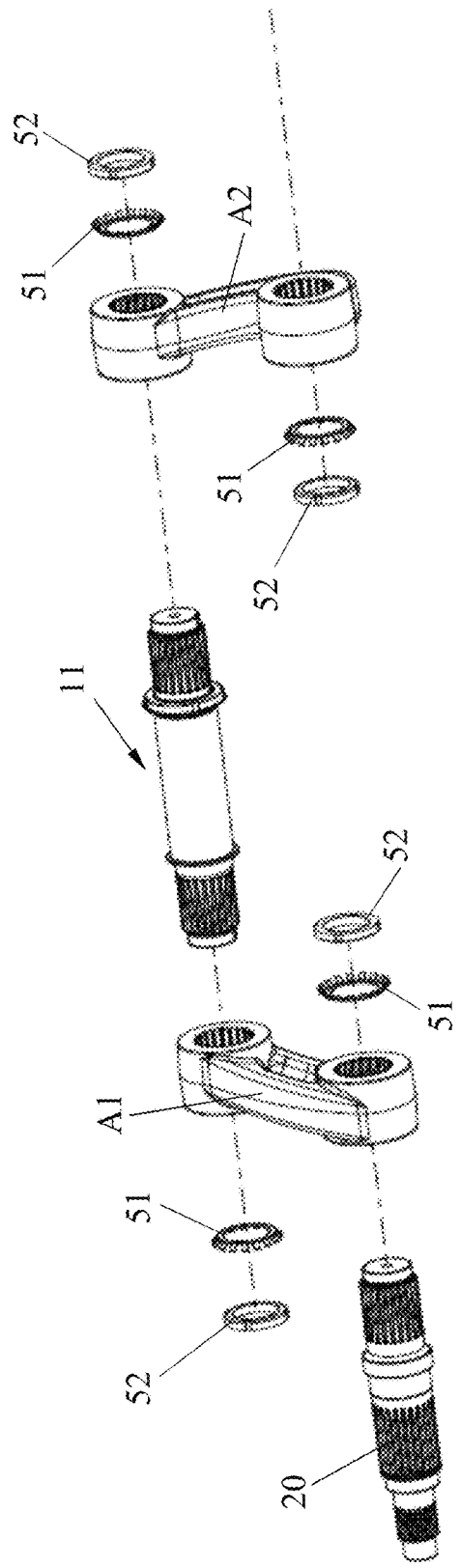
FIG. 4 is a partial exploded view of the crankshaft shown in FIG. 3.

FIG. 2 shows an image of the moveable elements of a packer mechanism according to an embodiment of the invention. Stationary elements of the packer mechanism, such as upper and lower guide surfaces and side walls for containing the crop flow are not shown, but may be brought into practice in the same manner as in currently known mechanisms. FIG. 3 shows an image of the crank shaft 12 as such. FIG. 4 shows a partial exploded view of the crank shaft 12, indicating the different constituent components.

Figure 7:
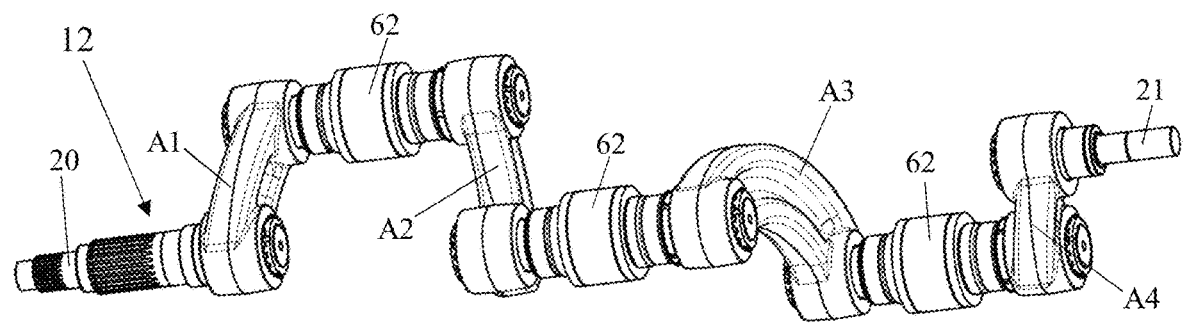
FIG. 7 shows the crank shaft of FIG. 3, provided with rotary bearings on the crank pins.
Figure 8:
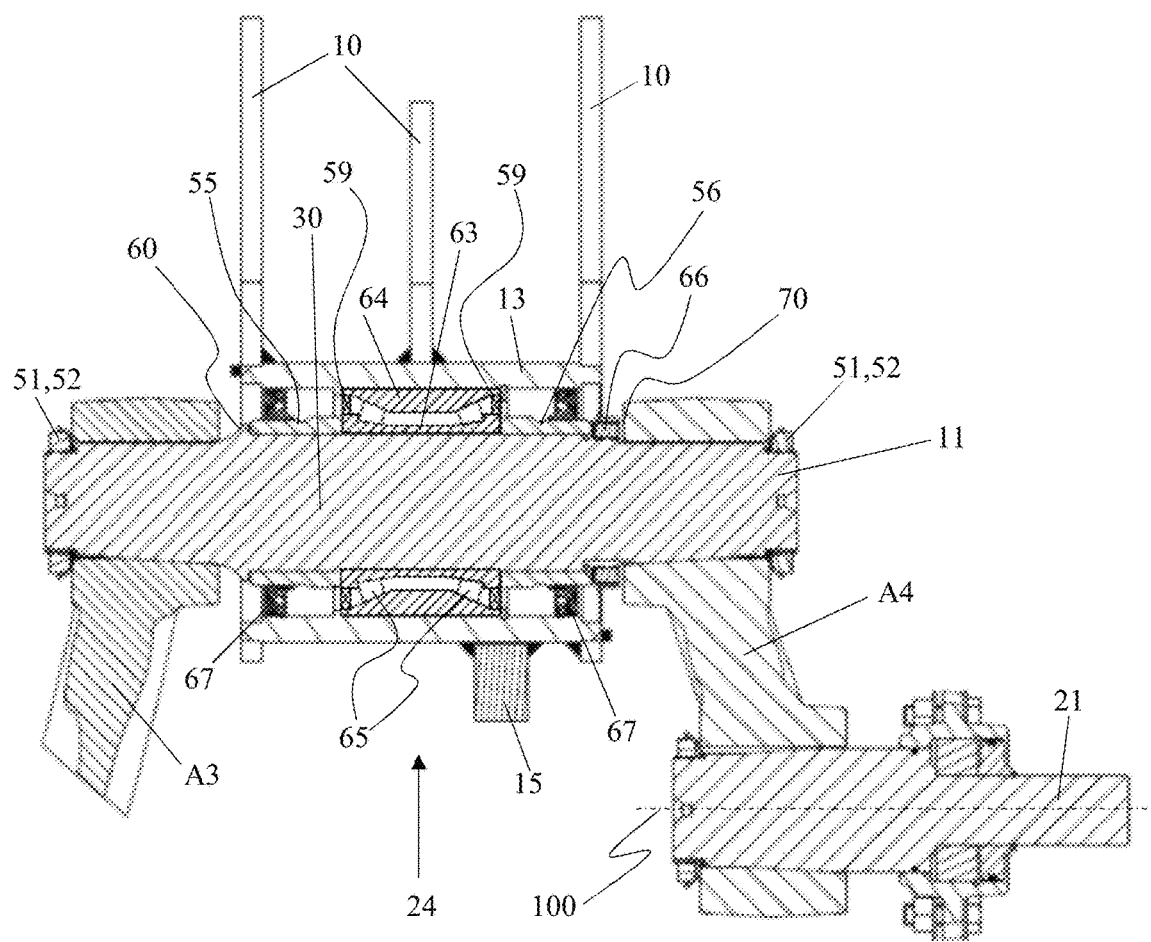
FIG. 8 is a section view of the bearing arrangement on a crank pin in the embodiment of FIG. 7.

The crank shaft 12 is rotatable about a central rotation axis 100. The shaft 12 comprises a first and second outer end 20 and 21 which are to be supported by rotary bearings in the housing of the baler. The crank shaft of this particular embodiment comprises three crank taps 22,23,24, but the invention is not limited to this number. The term 'crank tap' is used in this description to indicate the assembly of a crank pin 11, at least one rotary bearing, a cylinder 13 that is rotatable via the bearing relative to the crank pin, a set of packer teeth 10 fixed to the cylinder 13, and a support rod 14 that is rotatably attached to a bracket 15 fixed to the cylinder 13 on the opposite side of the teeth 10. However, the position of the bracket 15 in a packer mechanism of the invention may differ from the particular arrangement shown in the drawings. The rotary bearings are not visible in FIGS. 2-4. An example of a suitable bearing arrangement is shown in FIGS. 7 and 8 and will be described in detail later in this text. At their opposite ends, the support rods 14 are rotatably attached to a support structure not shown in the drawings. The function of the support rods 14, as known in the art, is to control the position of the packer teeth 10 during rotation of the crank shaft 12 about the central rotation axis 100.

The angular positions of the pins 11 about the central axis 100 defines the timing sequence according to which the packer teeth 10 perform the packing motion. In the embodiment shown in FIG. 2, when the shaft rotates in the indicated direction, the crank taps move forward in the order 22-24-23.

Figure 9:
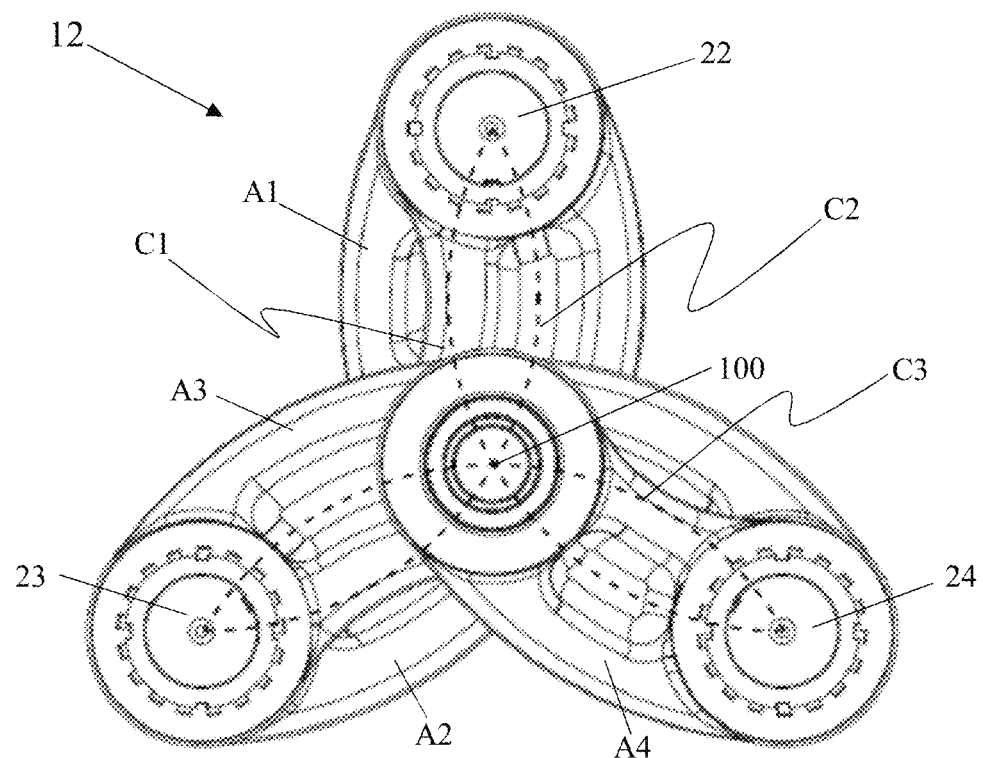
FIG. 9 shows a side view of the crank shaft of FIG. 3, illustrating the curved shape of the crank arms.

The crank pins 11 are fixed to neighbouring pins and—in the case of the pins of the two outer crank taps 22 and 24, to the outer ends 20 and 21 of the crank shaft, through a total of four crank arms A1 to A4. Two outer crank arms A1 and A4 connect the pins of the outer crank taps 22 and 24 to the respective outer ends 20 and 21 of the shaft 12. Two middle crank arms A2 and A3 connect the pin of the middle crank tap 23 to the two outer crank taps 22 and 24 respectively. As illustrated in FIG. 9, the angular positions of the crank pins relative to the central rotation axis 100 is distributed regularly over an arc of 360° around said central rotation axis. This enables the sequential packing movement of the teeth of the three crank taps. The length of the crank arms and their angular positions relative to each other are chosen in order to obtain this regular distribution of the crank taps. The crank arms in this embodiment are not oriented perpendicularly with respect to the central rotation axis 100. As best visible in FIG. 8, the arms on either side of a crank pin taper outward in the axial direction of the shaft, i.e. the arms are not perpendicular to the central rotation axis 100, to thereby maximize the span of the crank shaft across the stream of advancing crops. As seen in FIG. 2, the crank arms A1-A4 shown in this particular embodiment have a curved shape. The functionality of this shape will be described later in this text.

Turning now to FIGS. 3 to 6, the main characteristic of the present invention will be described in detail. The crank pins 11 are coupled to the crank arms by a tapered spline connection, of which an embodiment is illustrated in the figures. Not all the characteristics of this embodiment are limiting features of the invention's scope, which is defined only by the appended claims. FIGS. 5a,5b and 6a,6b show details of a pin 11 and of the corresponding crank arm A4, but the connection is preferably the same between all the pins and crank arms of the shaft 12. In the embodiment shown, the same spline connection is applied between the pins (which are not crank pins as such) which define the outer ends 20 and 21 of the crank shaft 12 and the respective arms A1 and A4. This is preferably the case, but these outer pins could be connected to the outer arms A1 and A4 by types of connections other than the tapered spline connection.

At both ends of the crank pin 11, i.e. on either side of the pin's central portion 30 onto which the rotary bearings are to be mounted for rotation of the packer teeth 10, an angular array of external non-tapered axial splines 31 is provided, extending at a constant diameter D1 between an inner axial position 32 and an outer axial position 33 along the central axis 39 of the crank pin 11. The valleys 29 in between the splines 31 taper downward from the diameter D1 at the inner axial position 32 to a diameter D2 smaller than D1 at an intermediate axial position 34.

Then the valleys continue at a constant diameter D2 between the intermediate axial position 34 and the outer position 33. The valleys 29 thus comprise a tapered section 37 and a straight section 38. Beyond the outer positions 33 on both sides of the crank pin 11, the pin comprises a threaded end 35 of constant diameter. The crank arm A4 (as well as all the other crank arms) comprises two openings 40, each provided with as many internal splines 41 as each of the ends of the crank pin 11 comprises external splines 31 (i.e. the number of internal splines 41 is equal also to the number of tapered valleys 29 on the outer end of the crank pin). As seen in FIG. 6b, the internal splines 41 comprise a tapered portion 46 extending between the first end section 42 of the opening 40 and an intermediate axial section 43 along the central axis 50 of the opening 40, and a straight portion 47 extending between the intermediate section 43 and the second end section 44 of the opening 40. The valleys in between the internal splines 41 are non-tapered, i.e. extend along a constant diameter, to accommodate the insertion of the external splines 31 of the pin 11.

The dimensions of the external splines 31 and the valleys 29 on the pin 11 and the internal splines 41 and valleys in the openings 40 of the crank arm A4 are such that the pins 11 can be inserted in the openings by interlocking the external splines 31 into the valleys between the internal splines 41, until the threaded end 35 protrudes through the opening 40. At this point, the tapered portions of the valleys 29 are in contact with the tapered portions of the internal splines 41. The crank pin 11 is inserted into the openings 40 with a degree of force to overcome friction between the contacting tapered and straight surfaces. This friction thereby establishes a preliminary connection between the assembled crank pin 11 and the crank arm A4, once the crank pin 11 is fully inserted in the opening 40, up to the point where the threaded end 35 protrudes through the opening 40. Then a washer 51 and a locking nut 52 are mounted (see FIGS. 3 and 4) on the threaded ends 35 and screwed tightly against the end face of the crank arm, thereby pulling the crank pin 11 further towards said end face. The locking force is configured to tighten and lock the spline connection by elastic deformation of the contacting surfaces, thereby realizing a strong connection. A bearing nut known as such in the art is preferably used as the locking nut 52.

Using the wording of the appended claims, the valleys 29 on the crank pin 11 are the tapered spline features on the pin side, and the internal splines 41 in the opening 40 are the tapered spline features on the side of the crank arm A4. The profiles of the spline features on the crank pin 11 and in the openings 40 may be reversed, i.e. the pin 11 could be provided with tapered external splines tapering downward from the diameter D1 to a lower diameter D2 between the positions 32 and 34 or 33, separated by valleys placed at a constant diameter D2 or lower than D2, while the openings 40 are provided with tapered valleys separated by splines placed at a constant diameter. A 'tapered spline feature' is generally a tapered spline or a tapered valley. The feature is 'tapered' if at least a portion of the feature changes from a higher to a lower diameter.

According to a preferred embodiment, the number of tapered spline features (or the number of non-tapered features separating the tapered features) on each side of the pins 11 is an integer multiple of the number of crank pins 11, the integer being positive and higher than zero. This enables the use of crank pins 11 with identical spline arrangements on both sides of the pin, and crank arms with identical spline arrangements in both openings 40. If the number of tapered spline features is not an integer multiple of the number of crank pins, the position of the splines 31 on the pin and in the opening 40 of the crank arm needs to take into account the required angular position of the crank arm relative to the crank pin, which would require different spline positions on the two ends of each crank pin. When the number of splines 31 (and valleys 29) is an integer multiple of the number of pins, the angular positions of the splines can be made identical on both ends of the pin, whilst allowing the arms to be correctly mounted by assembling one arm at one end of the pin at 120° relative to the arm at the other end. In that case, all three pins can be made identical to each other, and also the outer arms A1 and A4 can be made identical to each other, as well as the inner arms A2 and A3.

An alternative for the locking nuts 52 on both sides of the crank pin 11 could be to make the pin hollow and to provide a single locking bolt that passes axially through the crank pin and a locking nut screwed onto the end of the bolt, to thereby lock the pin into a fixed position relative to two crank arms. Another alternative could be to provide axial threaded holes on both sides of the crank pin 11, and to insert fixing bolts in both holes and screw the bolts tight against the end faces of the two crank arms.

Preferably, the spline connections are provided with markers which indicate the correct assembly angle between each crank pin and the crank arms to which it is connected, in order for a pre-defined timing sequence to be achieved by the assembled crank shaft. According to an embodiment, one internal spline 41 may be removed on the crank arm side, creating a broader valley in between two of the splines 41. On the crank pin side, one of the external splines 31 is made broader, so as to fit in the broader valley. This serves the purpose of an assembly marker: the crank pin can then only be assembled to the arm according to one assembly angle, defined by the requirement that the broader spline 31 faces the broader valley. Generally, this embodiment is characterized by the replacement of a tapered spline feature on the crank pin 11 and in the opening 40 by a non-tapered spline feature, so that the assembly can only be made when the non-tapered spline features are placed face-to-face. In the above embodiment, the tapered internal spline 41 in the opening 40 is replaced by a non-tapered broader valley, and the tapered valley 29 on the pin 11 is replaced by a broader non-tapered external spline.

According to the embodiment shown in the drawings, all the connections between the crank pins 11 and the arms A1-A4 are tapered spline connections as illustrated in FIGS. 5a,5b and 6a,6b. Generally however, a packer mechanism according to the invention comprises a crank shaft having at least one crank pin 11 that is connected to at least one crank arm by the above-described tapered spline connection. In some circumstances, it may be advantageous from a cost perspective or based on predicted loads, to execute only one or more selected connections as tapered spline connections, and to apply other connection types between the remaining crank pins and arms.

Another advantageous characteristic that is optional within the broader scope of the invention, but which represents a useful embodiment, is illustrated in FIGS. 7 and 8, with some relevant features visible also in FIGS. 5a,5b and 6a,6b. The crank pin 11 is provided with a shoulder 60 located at one side of its central portion 30, and a threaded section 61 at the other side of said central portion 30. These features enable the fixation of at least one rotary bearing on the central portion 30 of the pin 11. FIG. 7 illustrates the complete crank shaft 12 provided with bearings 62. The bearings in this particular embodiment are so-called 'hub units' 62, which are known bearing types, represented in a simplified way in FIG. 8, which shows a detailed section of the fully assembled crank tap 24 between the arms A3 and A4. The hub unit comprises an inner ring 63 and an outer ring 64, rotatable relative to each other through a double set of cone-shaped rollers 65, in a space comprising a lubricant and closed off by seals 59 on both sides of the rollers. The inner ring 63 of the hub unit is mounted in the axial direction between a first and second bushing 55 and 56. The first bushing 55 is mounted against the shoulder 60, while the second bushing 56 is held in place by a fixing nut 66 screwed onto the threaded section 61 of the pin 11. By screwing the fixing nut 66 tight, the first and second bushing 55 and 56, and thereby the inner ring 63 of the hub unit are fixed onto the pin 11 by securing the inner ring 63 in the axial direction. The cylinder 13 is clamped onto the outer ring 64 of the hub unit 62. Additional seals 67 are provided at the outer ends of the cylindric area between the first and second bushing 55,56 and the cylinder 13. This way of assembling the packer teeth 10 to the crank pins 11 enables the use of closed hub units 62 which theoretically do not require maintenance. A general advantage of an assembled crank shaft applied in a packer mechanism according to the invention, as opposed to a welded crank shaft, is that the use of split bearings can be avoided.

According to the embodiment shown, the fixing nut 66 is in close proximity to the end face 70 of the crank arm A4. This enables the use of the fixing nut 66 as a disassembling aid when the crank pin 11 needs to be separated from the crank arm A4. After removing the locking nut 52 and washer 51, the pin 11 is still fixed to the arm A4 due to the elastic deformation of the tapered spline connection described above and the friction forces between the corresponding tapered and straight parts of this spline connection. By releasing the fixing nut 66, after the removal of the locking nut 52 and the washer 51, this nut 66 pushes against the end face 70 of the arm A4, thereby aiding in the separation of said arm A4 from the crank pin 11, i.e. in the disassembly of the spline connection. The spline connection on the other side of the pin (the side where the shoulder 60 is located), does not have this disassembling aid feature. However, the disassembling aid 66 allows to release first the spline connections on one side of all the pins, which splits up the crank shaft into separate elements, each element comprising one pin and one crank arm. These elements are easier to manipulate than the full crank shaft, and can be disassembled for example using a hydraulic press.

In the embodiment shown in the drawings, each crank pin 11 is provided with a single rotary bearing 62 in the form of the hub unit 62. It is also possible to provide multiple bearings on a single crank pin 11, the bearings mounted side by side and fixed simultaneously between the fixing nut 66 and the shoulder 60.

As seen in FIG. 9, the crank arms A1 to A4 are curved so that the assembled crank shaft is essentially balanced statically about the central rotation axis 100, i.e. the weight of the pins 11 and the crank arms A1 to A4 is evenly distributed along the circumference of the shaft so that there is essentially no static unbalance. In the preferred embodiment shown in FIG. 9, the curvatures of the arms are such that when the crank shaft is seen in a side view perpendicular to the central rotation axis 100, the projected centre lines of the crank arms are shaped as circle arcs having the same radius, and essentially passing through the central rotation axis 100. The centre lines are projected on a plane perpendicular to the central axis (i.e. the plane of the drawing in FIG. 9). Three circle arcs of the same length can be distinguished: a first arc C1 formed by the combined centre lines of the outer arms A1 and A4, a second arc C2 formed by the centre line of the arm A2 and a third arc C3 formed by the centre line of the arm A3. As the arms are shaped as curved arms having essentially the same height and thickness, this creates a structure that is statically balanced, so that when the shaft 12 rotates, vibrational loads are reduced. Also, when the crank shaft is statically balanced, sudden rotations of the shaft during mounting of the shaft are avoided, which represents a safety benefit.

The scope of this embodiment is not limited to the curved crank arms shown in FIG. 9, nor to a crank shaft having 3 crank taps. Generally, this embodiment of the invention includes a crank shaft configured to be supported on two lateral positions, and having three or more eccentric crank pins arranged between said lateral positions, and no crank pins which are coaxial with the central rotation axis 100, and wherein the crank arms are shaped differently from straight crank arms, the difference being such that the shaft becomes statically balanced whereas the same shaft would be out of balance when all the arms are straight or have a straight projection on a plane perpendicular to the central axis. The way in which this is achieved may depend on the number of crank taps, the angular spacing between each pair of neighbouring crank pins, as well as on the order in which the taps are performing the packer movement.

Figure 10:
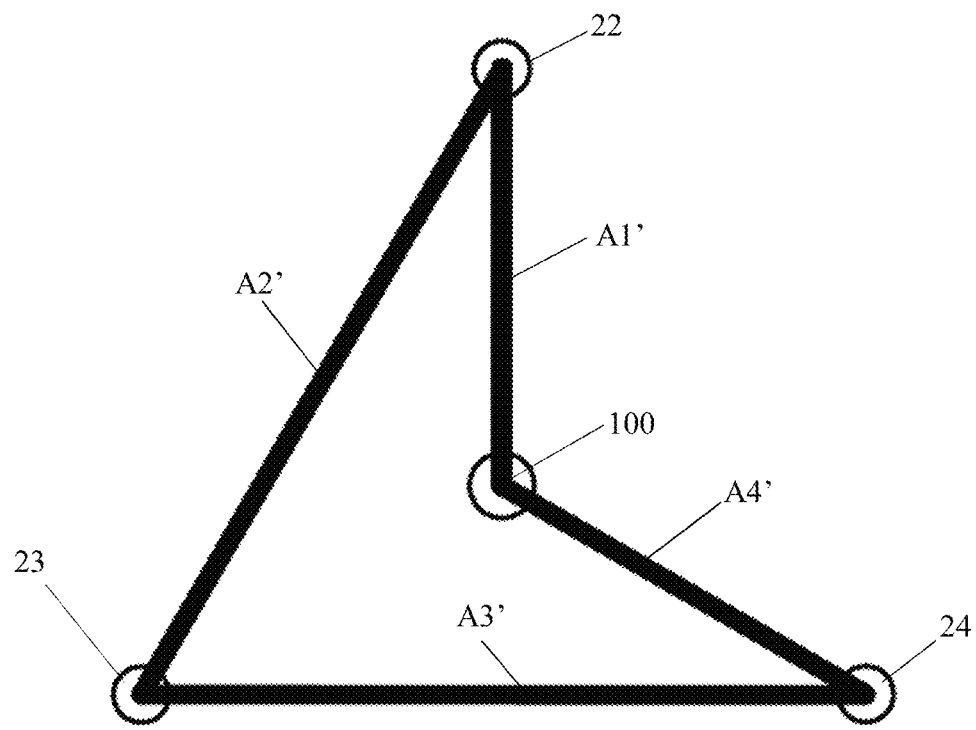
FIG. 10 illustrates a side view of a crank shaft that is not according to the embodiment of FIG. 9. While the shaft of FIG. 10 has the same crank pin arrangement as the shaft shown in FIG. 9, it is equipped with straight instead of curved crank arms.

The embodiment of FIG. 9 is therefore just one example of a shaft according to this embodiment of the invention. As seen in FIG. 10, if the projections of the arms A1' to A4' would be straight, for the same sequence and annular spacing of the crank taps 22 to 24, the assembled shaft would not be statically stable in its rotation about the central axis 100. The curvature of the arms solves this problem, as clearly seen in FIG. 9.

Figure 11A:
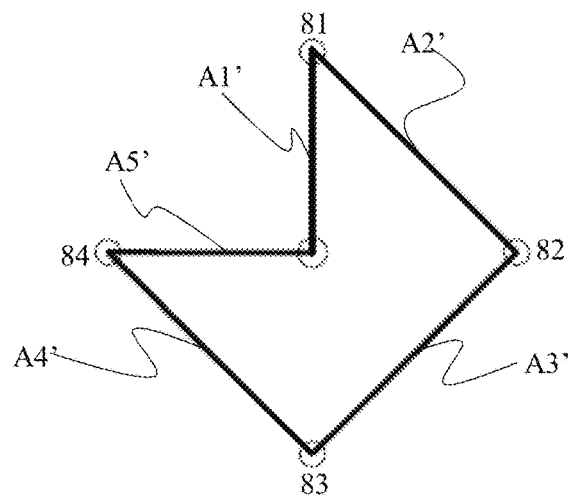
FIGS. 11a to 11e illustrate a crank shaft having 4 crank pins and provided with either straight arms (according to the prior art—FIG. 11a), with curved arms (according to an embodiment of the invention—FIGS. 11b and 11c) or with hook-shaped arms (according to another embodiment—FIGS. 11d and 11e).
Figure 11B:
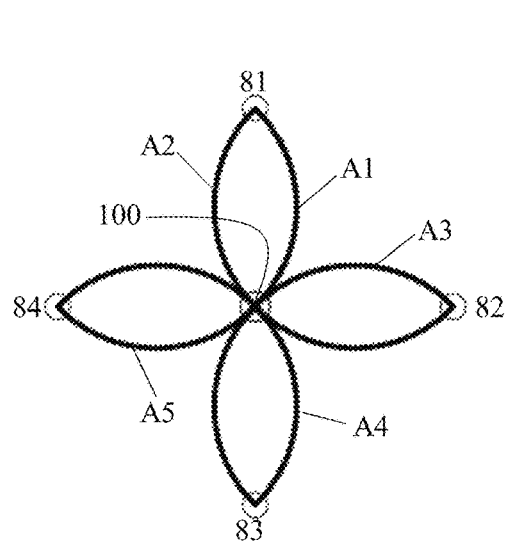

FIG. 11a shows a simplified side view of a crank shaft having four eccentric crank taps 81 to 84, and straight arms A1' to A5'. The pins of the crank taps are shifted 90° with respect to each other going from one side of the shaft to the other, i.e. the packer movement is performed sequentially by the 4 crank taps going from one side to the other. Clearly the shaft is not statically balanced. FIG. 11b shows a crank shaft having the same crank tap locations and timing as the shaft in FIG. 11a, but now the crank arms A1 to A5 are arc-shaped, to the extent that the resulting shaft is in effect statically balanced. The exploded view in FIG. 11c makes it easier to distinguish the separate arms A1 to A5. Like the embodiment of FIG. 9, the centre lines of the arms are defined as circle arcs of the same radius, and all passing through the central rotation axis 100.

Figure 11C:
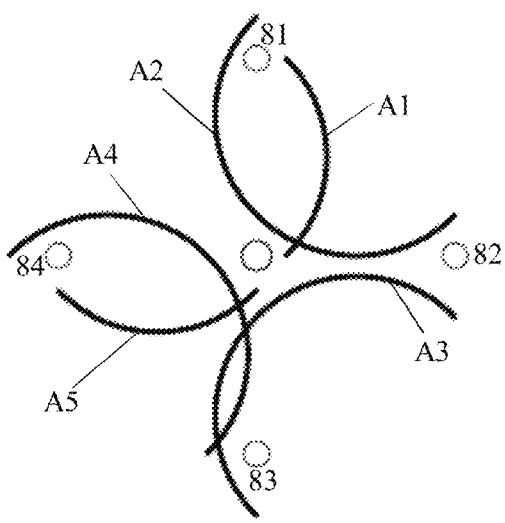
Figure 11D:
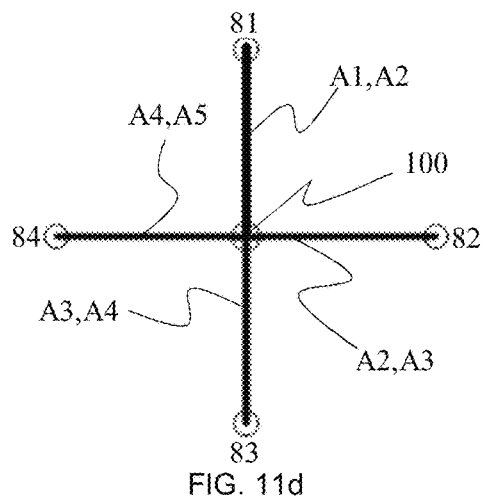
Figure 11E:
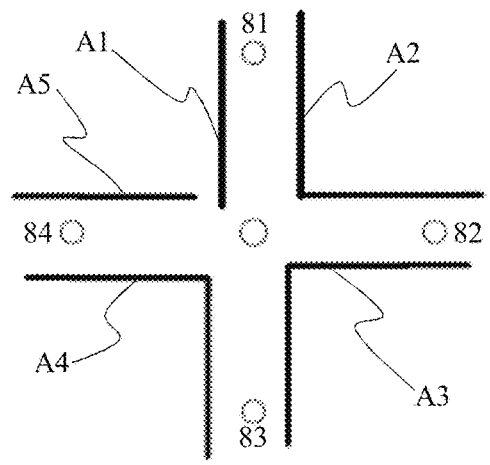

The shape of the arms may be other than arc-shaped, for example hook- or boomerang-shaped. According to some embodiments, only a sub-group of the arms have a non-straight shape, while other arms may be straight or have a straight projection on the plane perpendicular to the central axis 100. For example, an alternative for the shaft of FIGS. 11b and 11c is shown in FIGS. 11d and 11e, consisting of two straight arms A1 and A5 and three hook-shaped arms A2 to A4.

Figure 12:
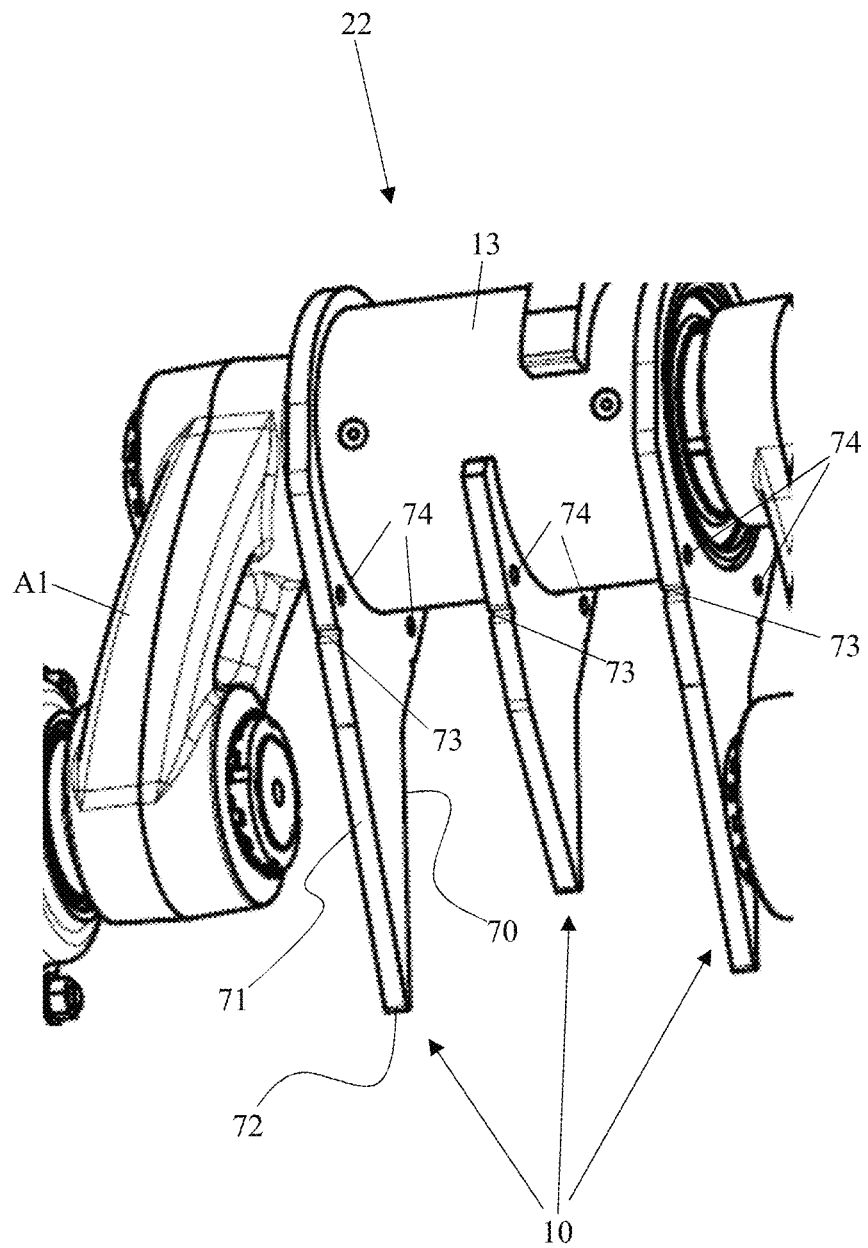
FIG. 12 illustrates an aspect of the invention according to which the packer teeth can be easily removed and replaced.

A specific aspect of the invention is now described, with reference to FIG. 12, which is a more detailed view of the first crank tap 22 illustrated in FIG. 2. As in existing systems, the packer teeth 10 comprise a back-side edge 70 and a front-side edge 71 which meet at a pointed end 72 of the tooth. At least the back-side edge 70 is preferably curved or hook-shaped to enable the teeth to grab the crops and drag them towards the pre-compression chamber. According to the specific aspect of the invention, the teeth 10 are provided with a transversal groove 73 in an upper section of the front-side edge 71. The groove 73 is an indication of the optimal location for commencing the sawing off of the tooth in case of wear or damage of the tooth. Furthermore, the tooth is provided with two holes 74 placed above the groove 73 and close to the upper section of the tooth. In the embodiment of FIG. 12, this upper section is the intersection between the tooth 10 and the cylinder 13. The holes 74 are placed relative to the groove 73 in such a way that after sawing off the tooth along a line starting from the groove 73, the remaining portion of the tooth comprises the holes 74. These holes 74 enable the easy replacement of a tooth by screwing a replacement tooth onto the remaining tooth portion after sawing off a damaged or worn tooth, using bolt connections inserted through the holes 74. The number of holes 74 may differ from two. Preferably at least two holes are provided in each tooth.

According to a preferred embodiment of this aspect of the invention, the back-side edge 70 of the steel teeth is reinforced to increase the resistance of this edge to wear. This may be done by hard-facing the back-side edge 70: applying a bead or layer of wear resistant metal. The bead or layer may be applied by welding, laser cladding or thermal spraying. Suitable metal compositions might include one or more of the following: manganese steel, nickel/cobalt/tungsten alloys and/or carbides.

The aspect of the invention described in the two preceding paragraphs and illustrated in FIG. 12 may be applied separately from all the embodiments described previously. The groove 73 and openings 74, and possibly the reinforced back side edge 70 are therefore applicable as an improvement on any existing crank shaft of a packer mechanism of an agricultural baler, including a packer mechanism comprising a welded crank shaft. The invention is therefore related to a packer mechanism including a crank shaft that includes the aspect described in the two previous paragraphs.

The invention claimed is:

1. A packer mechanism for an agricultural baler, the mechanism comprising:
   a crank shaft rotatable about a central rotation axis, the crank shaft comprising:
     a plurality of crank arms; and
     two or more eccentrically placed crank pins, fixed between respective pairs of the crank arms, each of the crank pins comprising two outer ends and a central portion;
   a plurality of packer teeth mounted rotatably with respect to the crank pins,
   at least one rotary bearing mounted on the central portion of each of the crank pins, for enabling rotation of the packer teeth relative to the crank pins; and
   a plurality of support rods for controlling an orientation of the packer teeth during the rotation of the crank shaft,
   wherein at least one of the crank pins is assembled to one of the crank arms by a tapered spline connection, the tapered spline connection comprising:
     on at least one outer end of the at least one of the crank pins: a first angular array of tapered spline features comprising at least a portion that tapers downward from a first diameter to a second diameter smaller than the first diameter,
     in at least one opening provided on an outer end of the one of the crank arms: a second angular array of tapered spline features of which at least a portion is tapered and configured to interlock with the first angular array when the at least one of the crank pins is inserted into the at least one opening provided on the outer end of the one of the crank arms, whereby the tapered portions of the respective spline features are in contact with each other, and
     mechanical locking features for locking the tapered spline connection,
   wherein the central portion of the at least one of the crank pins is provided with a shoulder feature on one side of the central portion and a threaded section on the other side of the central portion,
     at least one rotary bearing is mounted on the central portion and enables rotation of a cylinder onto which the packer teeth are fixed, relative to the at least one of the crank pins, and
     the at least one rotary bearing is fixed to the central portion of the at least one of the crank pins by a fixing nut screwed onto the threaded section, which pushes the at least one rotary bearing against the shoulder feature or against an intermediate bushing mounted between the at least one rotary bearing and the shoulder feature.

2. The packer mechanism according to claim 1, wherein the spline features of the at least one of the crank pins and of the at least one opening comprise a tapered section and a straight section.

3. The packer mechanism according to claim 1, wherein a number of tapered spline features on the at least one outer end of the at least one of the crank pins and in the at least one opening is an integer multiple of a number of the crank pins on the crank shaft, the integer being positive and higher than zero.

4. The packer mechanism according to claim 1, wherein the mechanical locking features comprise a threaded end portion at the at least one outer end of the at least one of the crank pins, the threaded end portion protruding through the at least one opening, and a locking nut screwed onto the threaded end portion, thereby pulling the spline features of the at least one of the crank pins tightly against the spline features of the at least one opening, when the locking nut is screwed against an end face of the one of the crank arms.

5. The packer mechanism according to claim 1 wherein the fixing nut is at proximate to an end face of the one of the crank arms, so that the fixing nut enters into contact with the end face when the fixing nut is unscrewed.

6. The packer mechanism according to claim 1 wherein the at least one rotary bearing is a closed hub unit including seals.

7. The packer mechanism according to claim 6, wherein the packer teeth are mounted on a cylinder clamped onto the hub unit, and wherein additional seals are mounted at both axial ends of the central portion of the at least one of the crank pins, the additional seals being configured for closing off space between the central portion of the at least one of the crank pins and the cylinder.

8. The packer mechanism according to claim 1, wherein in the first and second angular array of tapered spline features, one tapered spline feature is replaced by a non-tapered spline feature, so that the at least one of the crank pins can only be inserted into the at least one opening when the non-tapered features are placed face to face.

9. The packer mechanism according to claim 1, wherein each of the packer teeth comprises a front-side edge and a back-side edge, wherein the front-side edge is provided with a transversal groove which indicates a starting position for sawing off the each tooth when the each tooth needs to be replaced, and wherein the each tooth is provided with openings positioned so that when the each tooth has been sawn off starting from the groove, the openings remain in a remaining tooth portion, the openings enabling screwing on a replacement tooth onto the remaining tooth portion.

10. The packer mechanism according to claim 1, wherein:
the crank shaft is supported at not more than two support locations, located at outer ends of the crank shaft,
the packer mechanism further comprises support bearings which enable rotation of the crank shaft about the central rotation axis,
the two or more eccentrically placed crank pins are three or more eccentrically placed crank pins located at predefined angular positions with respect to the central rotation axis,
none of the three or more eccentrically placed crank pins are concentric with the central rotation axis, and
a shape of at least two of the crank arms deviates from a straight shape, to such an extent that the crank shaft is statically balanced about the central rotation axis.

11. The packer mechanism according to claim 10, wherein the at least two of the crank arms are curved or hook-shaped in a plane perpendicular to the central rotation axis.

12. The packer mechanism according to claim 11, wherein each of the at least two of the crank arms has a center line intersecting the central rotation axis.

13. A packer mechanism for an agricultural baler, the mechanism comprising:
a crank shaft rotatable about a central rotation axis, the crank shaft comprising:
a plurality of crank arms; and
two or more eccentrically placed crank pins, fixed between respective pairs of the crank arms, each of the crank pins comprising two outer ends and a central portion;
a plurality of packer teeth mounted rotatably with respect to the crank pins,
at least one rotary bearing mounted on the central portion of each of the crank pins, for enabling rotation of the packer teeth relative to the crank pins; and
a plurality of support rods for controlling an orientation of the packer teeth during the rotation of the crank shaft,
wherein at least one of the crank pins is assembled to one of the crank arms by a tapered spline connection, the tapered spline connection comprising:
on at least one outer end of the at least one of the crank pins: a first angular array of tapered spline features comprising at least a portion that tapers downward from a first diameter to a second diameter smaller than the first diameter,
in at least one opening provided on an outer end of the one of the crank arms: a second angular array of tapered spline features of which at least a portion is tapered and configured to interlock with the first angular array when the at least one of the crank pins is inserted into the at least one opening provided on the outer end of the one of the crank arms, whereby the tapered portions of the respective spline features are in contact with each other, and
mechanical locking features for locking the tapered spline connection;
the crank shaft is supported at not more than two support locations, located at outer ends of the crank shaft,
the packer mechanism further comprises support bearings which enable rotation of the crank shaft about the central rotation axis,
the two or more eccentrically placed crank pins are three or more eccentrically placed crank pins located at predefined angular positions with respect to the central rotation axis,
none of the three or more eccentrically placed crank pins are concentric with the central rotation axis, and
a shape of at least two of the crank arms deviates from a straight shape, to such an extent that the crank shaft is statically balanced about the central rotation axis,
wherein the at least two of the crank arms are curved or hook-shaped in a plane perpendicular to the central rotation axis,
wherein each of the at least two of the crank arms has a center line intersecting the central rotation axis,
wherein the center lines of the at least two of the crank arms are circle arcs of a same radius.

14. An agricultural baler comprising a packer mechanism, the packer mechanism comprising:
a crank shaft rotatable about a central rotation axis, the crank shaft comprising:
a plurality of crank arms; and
two or more eccentrically placed crank pins, fixed between respective pairs of the crank arms, each of the crank pins comprising two outer ends and a central portion;
a plurality of packer teeth mounted rotatably with respect to the crank pins,
at least one rotary bearing mounted on the central portion of each of the crank pins, for enabling rotation of the packer teeth relative to the crank pins; and
a plurality of support rods for controlling an orientation of the packer teeth during the rotation of the crank shaft,
wherein at least one of the crank pins is assembled to one of the crank arms by a tapered spline connection, the tapered spline connection comprising:
on at least one outer end of the at least one of the crank pins: a first angular array of tapered spline features comprising at least a portion that tapers downward from a first diameter to a second diameter smaller than the first diameter,
in at least one opening provided on an outer end of the one of the crank arms: a second angular array of tapered spline features of which at least a portion is tapered and configured to interlock with the first angular array when the at least one of the crank pins is inserted into the at least one opening provided on the outer end of the one of the crank arms, whereby the tapered portions of the respective spline features are in contact with each other, and
mechanical locking features for locking the tapered spline connection,
wherein each of the packer teeth comprises a front-side edge and a back-side edge, wherein the front-side edge is provided with a transversal groove which indicates a starting position for sawing off the each tooth when the each tooth needs to be replaced, and wherein the each tooth is provided with openings positioned so that when the each tooth has been sawn off starting from the groove, the openings remain in a remaining tooth portion, the openings enabling screwing on a replacement tooth onto the remaining tooth portion.

* * * * *